US012663823B2

(12) United States Patent
Tsou et al.

(10) Patent No.: US 12,663,823 B2
(45) Date of Patent: Jun. 23, 2026

(54) FEEDBACK CONTROL SYSTEM AND FEEDBACK CONTROL METHOD

(71) Applicant: NOVATEK Microelectronics Corp., Hsinchu (TW)

(72) Inventors: Shan-Chiang Tsou, Taipei City (TW); Chi-Yi Lo, Kaohsiung City (TW); Jen-Hao Liao, Hsinchu County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 422 days.

(21) Appl. No.: 18/334,391

(22) Filed: Jun. 14, 2023

(65) Prior Publication Data

US 2024/0028061 A1 Jan. 25, 2024

(30) Foreign Application Priority Data

Jul. 25, 2022 (TW) ................................. 111127762

(51) Int. Cl.
*G05F 1/565* (2006.01)
*G05F 1/575* (2006.01)

(52) U.S. Cl.
CPC .............. *G05F 1/565* (2013.01); *G05F 1/575* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/465; G05F 1/468; G05F 1/562; G05F 1/565; G05F 1/567; G05F 1/569; G05F 1/571; G05F 1/573; G05F 1/5735; H02M 5/2573; H02M 1/081;
(Continued)

(56) References Cited

U.S. PATENT DOCUMENTS 7,949,025 B2 * 5/2011 Olea .................... H04B 10/572 372/38.1
11,385,666 B1 * 7/2022 Sadati ....................... G05F 1/56
(Continued)

FOREIGN PATENT DOCUMENTS

CN 101207958 A 6/2008
CN 201234371 Y 5/2009
(Continued)

*Primary Examiner* — Crystal L Hammond
*Assistant Examiner* — Nusrat Quddus
(74) *Attorney, Agent, or Firm* — CKC & Partners Co., LLC

(57) ABSTRACT

A feedback control system includes a driver chip and a power chip. The driver chip includes a first output terminal and a first input terminal. The first output terminal is to output a first detection voltage. The power chip includes a second input terminal and a second output terminal. The second input terminal is directly connected to the first output terminal, and the second output terminal is coupled to the first input terminal. The power chip generates a driving voltage according to the first detection voltage and outputs the driving voltage to the first input terminal.

13 Claims, 16 Drawing Sheets

300

400

(58) Field of Classification Search
CPC .......... H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H05B 39/048; B23K 11/24; H04B 2215/069
See application file for complete search history.

(56) References Cited

U.S. PATENT DOCUMENTS 12,374,254 B2 * 7/2025 Hong .................... H02M 3/158
2005/0046405 A1 * 3/2005 Trafton ..................... G05F 1/56 323/308
2006/0097572 A1 5/2006 Drouin et al.
2010/0225249 A1 * 9/2010 Liao ..................... H05B 45/347 315/297
2010/0289982 A1 * 11/2010 Akiyama ............... G09G 3/342 257/E29.166
2016/0360582 A1 * 12/2016 Kato ....................... H02M 1/32
2020/0072877 A1 3/2020 Wang
2020/0272120 A1 8/2020 Fujimura et al.
2020/0313422 A1 10/2020 Okajima
2021/0407355 A1 12/2021 Ju

FOREIGN PATENT DOCUMENTS

CN 106604442 A 4/2017
CN 111857315 A 10/2020
EP 1892825 A2 2/2008
TW 201633281 A 9/2016
TW 201913357 A 4/2019
WO 2018/216661 A1 11/2018

* cited by examiner

FEEDBACK CONTROL SYSTEM AND FEEDBACK CONTROL METHOD

RELATED APPLICATIONS

This application claims priority to Taiwanese Application Serial Number 111127762, filed Jul. 25, 2022, which is herein incorporated by reference.

BACKGROUND

Technical Field

The present disclosure relates to technology related to feedback control technology. More particularly, the present disclosure relates to a feedback control system and a feedback control method.

Description of Related Art

With development of technology, various integrated circuits (ICs) have been developed and widely used to form many electronic devices. The ICs need to receive suitable power to operate normally such that the electronic devices can provide correct functions.

SUMMARY

Some aspects of the present disclosure are to provide a feedback control system. The feedback control system includes a driver chip and a power chip. The driver chip includes a first output terminal and a first input terminal. The first output terminal is to output a first detection voltage. The power chip includes a second input terminal and a second output terminal. The second input terminal is directly connected to the first output terminal, and the second output terminal is coupled to the first input terminal. The power chip generates a driving voltage according to the first detection voltage and outputs the driving voltage to the first input terminal.

Some aspects of the present disclosure are to provide a feedback control method. The feedback control method includes following operations: outputting, by a first output terminal of a driver chip, a first detection voltage, in which the driver chip further comprises a first input terminal; receiving, by a second input terminal of a power chip, the first detection voltage, in which the second input terminal of the power chip is directly connected to the first output terminal of the driver chip, and a second output terminal of the power chip is coupled to the first input terminal of the driver chip; generating, by the power chip, a driving voltage according to the first detection voltage; and outputting, by the power chip, the driving voltage to the first input terminal of the driver chip.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
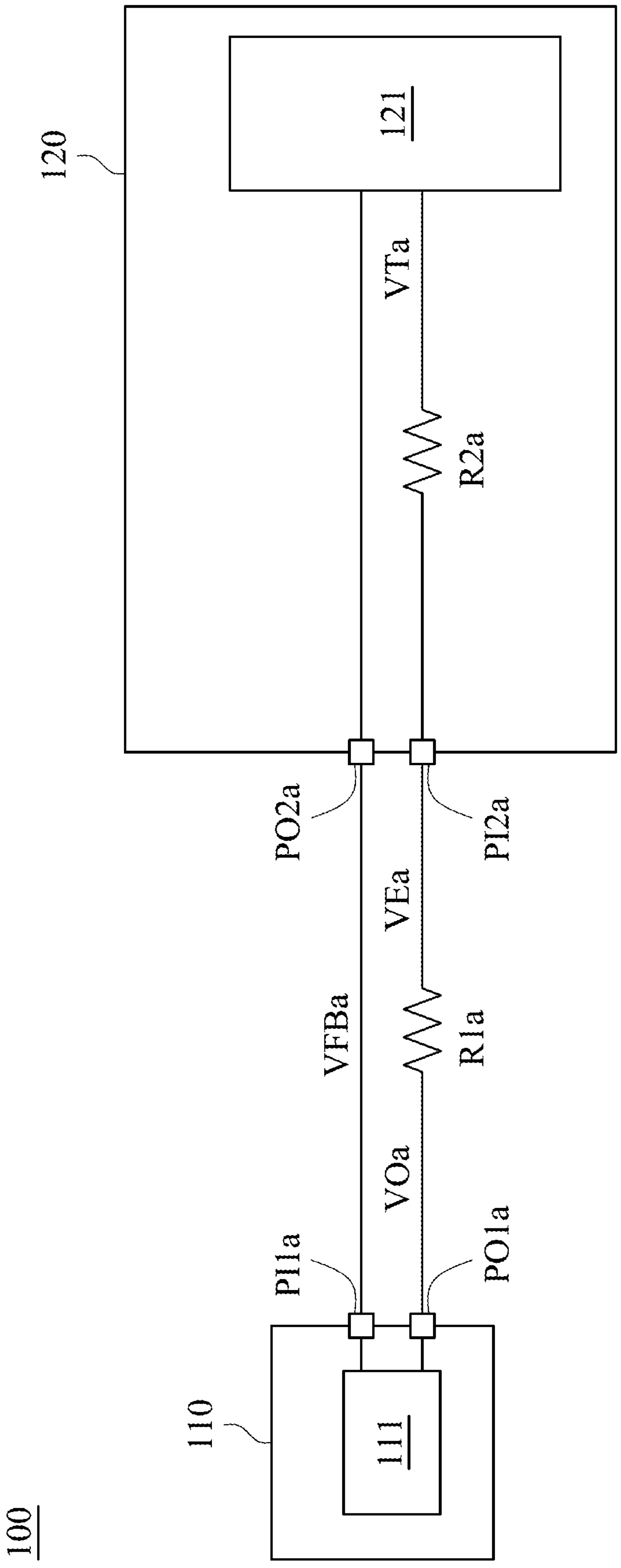
FIG. 1 is a schematic diagram of a feedback control system according to some embodiments of the present disclosure.

Reference is made to FIG. 1. FIG. 1 is a schematic diagram of a feedback control system 100 according to some embodiments of the present disclosure.

As illustrated in FIG. 1, the feedback control system 100 includes a power chip 110 and a driver chip 120. The driver chip 120 is coupled to the power chip 110. The driver chip 120 outputs a detection voltage VFBa. The power chip 110 receives the detection voltage VFBa from the driver chip 120. The power chip 110 generates (adjusts) a driving voltage VOa according to the detection voltage VFBa and outputs the driving voltage VOa to the driver chip 120.

The power chip 110 adjusts the driving voltage VOa according to the detection voltage VFBa (e.g., when the detection voltage VFBa is lower than a set voltage, the power chip 110 can increase the driving voltage VOa). Thus, the driver chip 120 can receive suitable power to operate normally.

As illustrated in FIG. 1, the power chip 110 can include a voltage converter circuit 111, an input terminal PI1$a$, and an output terminal PO1*a*. The voltage converter circuit 111 is coupled to the input terminal PI1*a* and the output terminal PO1*a*. The voltage converter circuit 111 can provide a voltage conversion function. For example, the voltage converter circuit 111 can be a boost converter, but the present disclosure is not limited thereto.

The driver chip 120 can include an application circuit 121, an input terminal PI2*a*, and an output terminal PO2*a*. The application circuit 121 is coupled to the input terminal PI2*a* and the output terminal PO2*a*. The application circuit 121 can provide various applications and functions. The input terminal PI1*a* is directly connected to the output terminal PO2*a*, and the output terminal PO1*a* is coupled to the input terminal PI2*a*.

As illustrated in FIG. 1, a series impedance R1*a* may exist between the power chip 110 and the driver chip 120 (between the output terminal PO1*a* and the input terminal PI2*a*). For example, the series impedance R1*a* includes the motherboard impedance, the connector impedance, the trace impedance of a flexible printed board, the anisotropic conductive film (ACF) impedance of the flexible printed board, the conductive film impedance, and the bump AFC bonding impedance. In addition, a series impedance R2*a* may exist between a pin of the input terminal PI2*a* and the application circuit 121. For example, the series impedance R2*a* includes the trace impedance from the pin of the input terminal PI2*a* to the application circuit 121.

Due to current consumption of the series impedance R1*a* and the application circuit 121, there is a problem of IR drop between the output terminal PO1*a* and the input terminal PI2*a*, causing an input voltage VEa inputted in to the driver chip 120 lower than the driving voltage VOa. Similarly, due to current consumption of the series impedance R2*a* and the application circuit 121, there is a problem of IR drop between the input terminal PI2*a* and the application circuit 121, causing an input voltage VTa received by the application circuit 121 lower than the input voltage VEa (i.e., the input voltage VTa is also lower than the driving voltage VOa). However, if the input voltage VTa is too low, the application circuit 121 cannot operate normally.

In order to avoid the problem above, the application circuit 121 can output the detection voltage VFBa through the output terminal PO2*a*, and the voltage converter circuit 111 can receive the detection voltage VFBa through the input terminal PI1*a*. The detection voltage VFBa can be a voltage at an internal node in the application circuit 121. In some embodiments, there is (almost) no power consumption between the output terminal PO2*a* and the input terminal PI1*a*, so there is (almost) no IR drop. Then, the voltage converter circuit 111 can generate (adjust) the driving voltage VOa according to the detection voltage VFBa and output the driving voltage VOa to the input terminal PI2*a*. Thus, even if there is the IR drop problem (due to the series impedance R1*a* and the series impedance R2*a*), the application circuit 121 in the driver chip 120 can still receive a suitable input voltage VTa to operate normally.

Figure 2A:
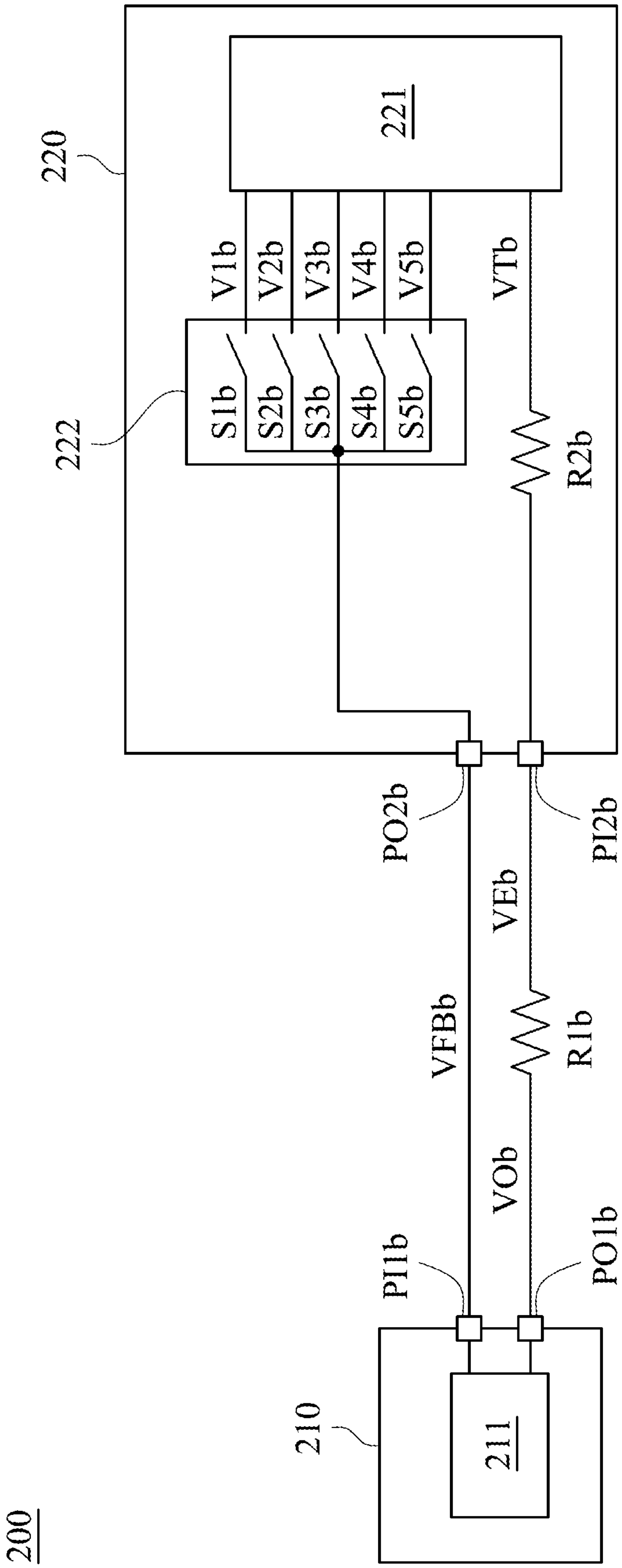
FIG. 2A is a schematic diagram of a feedback control system according to some embodiments of the present disclosure.

Reference is made to FIG. 2A. FIG. 2A is a schematic diagram of a feedback control system 200 according to some embodiments of the present disclosure.

A power chip 210, a voltage converter circuit 211, an output terminal PO1*b*, a driving voltage VOb, a series impedance R1*b*, an input voltage VEb, an input terminal PI2*b*, a series impedance R2*b*, an input voltage VTb, a driver chip 220, an application circuit 221, an output terminal PO2*b*, a detection voltage VFBb, and an input terminal PI1*b* in FIG. 2A are similar to the power chip 110, the voltage converter circuit 111, the output terminal PO1*a*, the driving voltage VOa, the series impedance R1*a*, the input voltage VEa, the input terminal PI2*a*, the series impedance R2*a*, the input voltage VTa, the driver chip 120, the application circuit 121, the output terminal PO2*a*, the detection voltage VFBa, and the input terminal PI1*a* in FIG. 1 respectively.

One of major differences between FIG. 2A and FIG. 1 is that the driver chip 220 in FIG. 2A further includes a control circuit 222. In some embodiments, when the application circuit 221 can operate in various application conditions and these application conditions correspond to different current consumption, the driver chip 220 can include the control circuit 222.

As illustrated in FIG. 2A, the control circuit 222 is coupled between the application circuit 221 and the output terminal PO2*b* to receive multiple detection voltages V1*b*-V5*b* from the application circuit 221. The control circuit 222 can switch the detection voltages V1*b*-V5*b* according to the application condition of the application circuit 221 to generate the detection voltage VFBb.

Furthermore, the control circuit 222 can include multiple switches S1*b*-S5*b*. First terminals of the switches S1*b*-S5*b* are coupled to the application circuit 221 to receive the detection voltages V1*b*-V5*b* respectively, and second terminals of the switches S1*b*-S5*b* are coupled to the output terminal PO2*b*. According to the application condition of the application circuit 221, one of the switches S1*b*-S5*b* can be turned on. For example, when the switch S1*b* is turned on according to the application condition of the application circuit 221, the switch S1*b* can transmit the detection voltage V1*b* to the output terminal PO2*b* to generate the detection voltage VFBb. Operations of the switch S2*b*-S5*b* are similar to the operations of the switch S1*b*, so they are not described herein again.

Although there are five detection voltages V1*b*-V5*b* and the control circuit 222 includes five switches S1*b*-S5*b* in FIG. 2A, the present disclosure is not limited thereto. Various suitable quantities are within the scopes of the present disclosure.

Figure 2B:
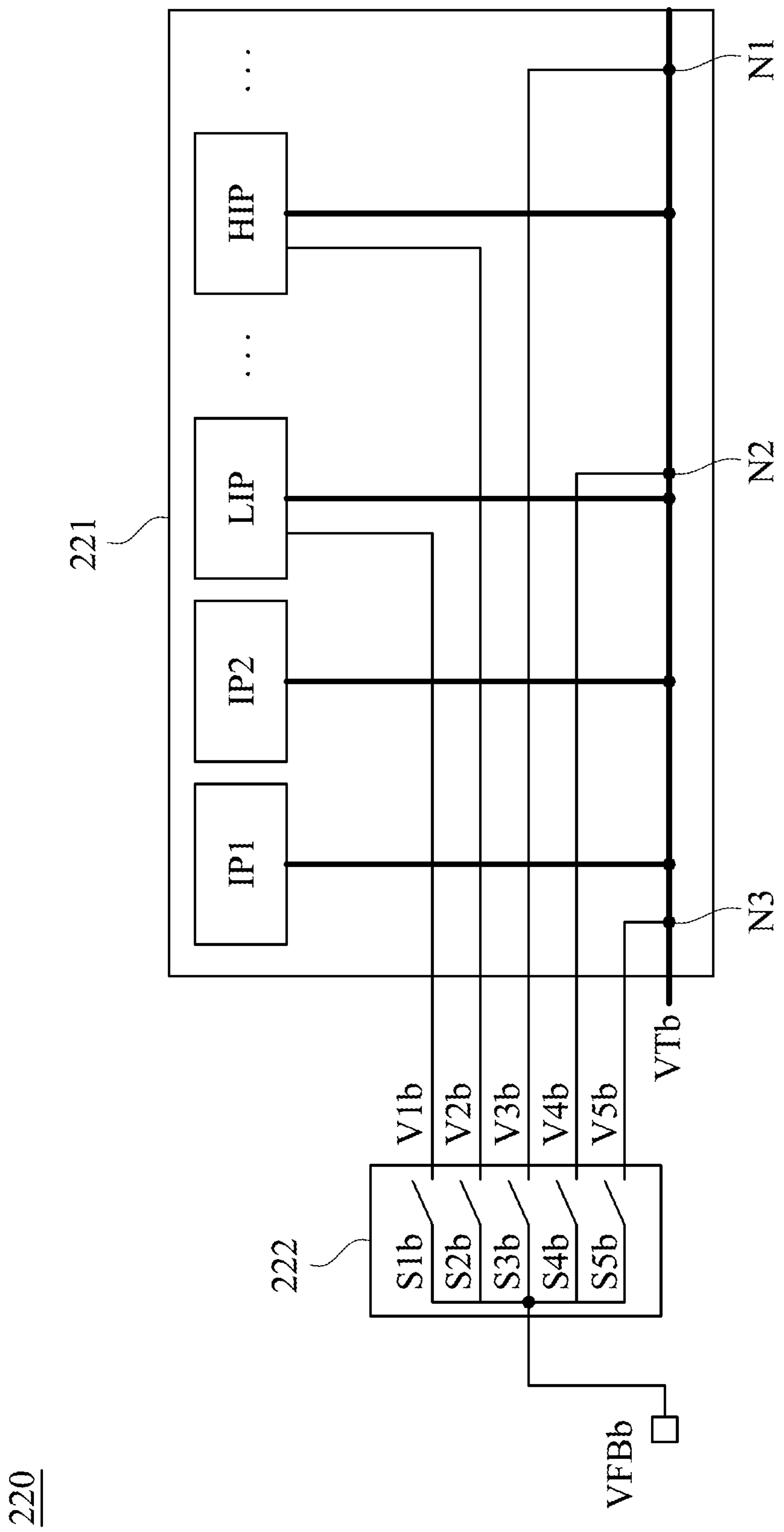
FIG. 2B is a schematic diagram of a driver chip according to some embodiments of the present disclosure.

References are made to FIG. 2A and FIG. 2B. FIG. 2B is a schematic diagram of the driver chip 220 according to some embodiments of the present disclosure.

As illustrated in FIG. 2B, the application circuit 221 includes a functional circuit IP1, a functional circuit IP2, a functional circuit LIP, a functional circuit HIP, and other functional circuits (not shown). These functional circuits can correspond to different load conditions. For example, the functional circuit LIP corresponds to a light-load condition, and the functional circuit HIP corresponds to a heavy-load condition.

As illustrated in FIG. 2B, the detection voltage V1*b* (light-load voltage) is an input voltage of the functional circuit LIP. The detection voltage V2*b* (heavy-load voltage) is an input voltage of the functional circuit HIP. The detection voltage V3*b* is a far-end input voltage (located at an input voltage node N1 away from the input voltage VTb) of the application circuit 221. The detection voltage V4*b* is a central input voltage (located at an input voltage node N2 between the far-end input voltage and a near-end input voltage) of the application circuit 221. The detection voltage V5*b* is the near-end input voltage (located at an input voltage node N3 near the input voltage VTb) of the application circuit 221.

As described above, the control circuit 222 can switch the detection voltages V1*b*-V5*b* according to the application condition of the application circuit 221 to generate the detection voltage VFBb. Effectively, the voltage converter circuit 211 can adjust the driving voltage VOb according to the detection voltages V1*b*-V5*b* (corresponding to different current consumption). Thus, even if there is the IR drop problem (due to the series impedance R1*b* and the series impedance R2*b*), the application circuit 221 in the driver chip 220 can still receive a suitable input voltage VTb to operate normally according to the driving voltage VOb.

Figure 3:
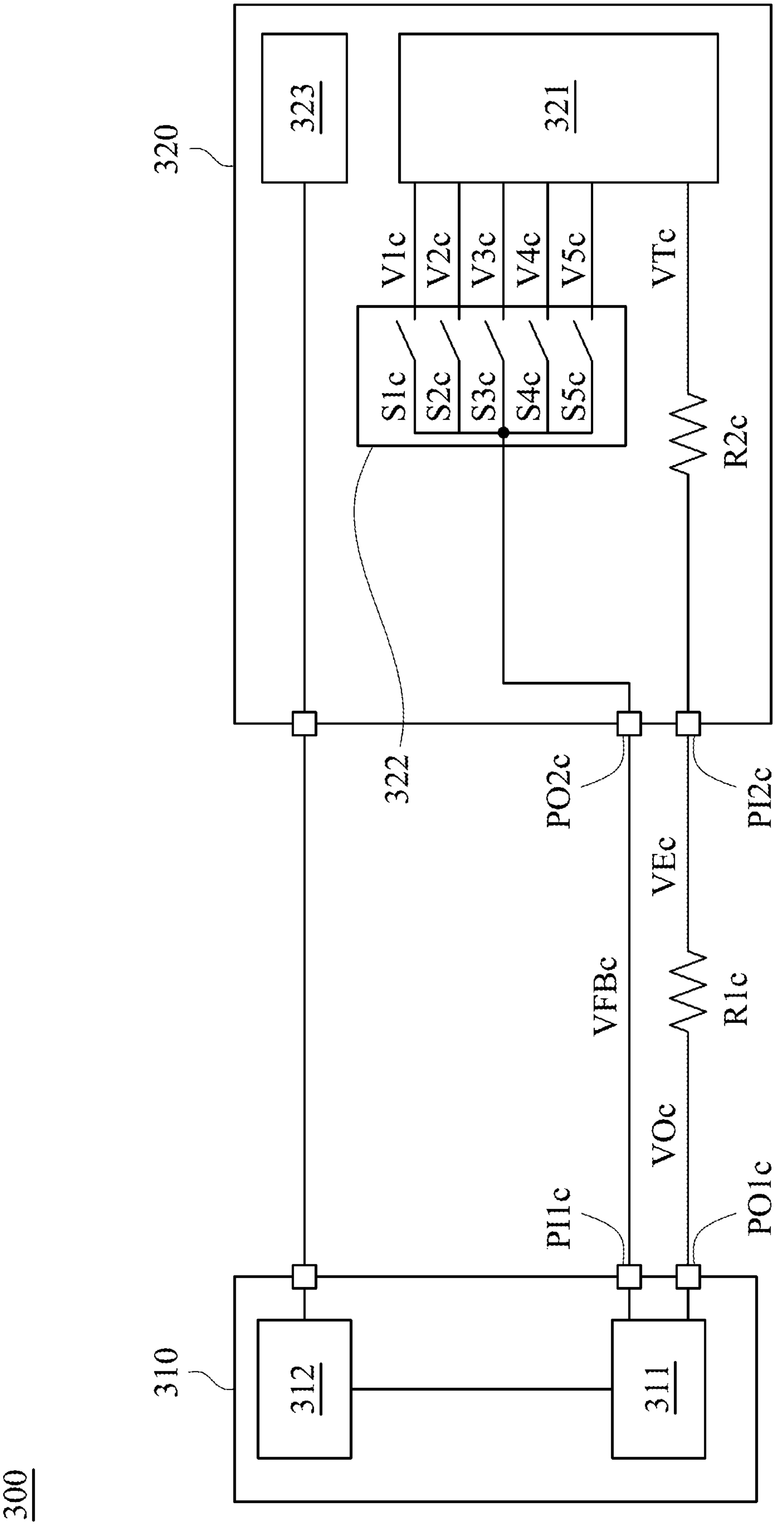
FIG. 3 is a schematic diagram of a feedback control system according to some embodiments of the present disclosure.

Reference is made to FIG. 3. FIG. 3 is a schematic diagram of a feedback control system 300 according to some embodiments of the present disclosure.

A power chip 310, a voltage converter circuit 311, an output terminal PO1*c*, a driving voltage VOc, a series impedance R1*c*, an input voltage VEc, an input terminal PI2*c*, a series impedance R2*c*, an input voltage VTc, a driver chip 320, an application circuit 321, a control circuit 322, switches S1*c*-S5*c*, detection voltages V1*c*-V5*c*, an output terminal PO2*c*, a detection voltage VFBc, an input terminal PI1*c* in FIG. 3 are similar to the power chip 210, the voltage converter circuit 211, the output terminal PO1*b*, the driving voltage VOb, the series impedance R1*b*, the input voltage VEb, the input terminal PI2*b*, the series impedance R2*b*, the input voltage VTb, the driver chip 220, the application circuit 221, the control circuit 222, the switches S1*b*-S5*b*, the detection voltages V1*b*-V5*b*, the output terminal PO2*b*, the detection voltage VFBb, the input terminal PI1*b* in FIG. 2A respectively.

One of major differences between FIG. 3 and FIG. 2A is that the power chip 310 in FIG. 3 further includes a decode pulse circuit 312 and the driver chip 320 further includes a power control circuit 323. In the embodiment in FIG. 3, the voltage converter circuit 311 can be used to adjust the driving voltage VOc according to the detection voltage VFBc. Thus, even if there is the IR drop problem (due to the series impedance R1*c* and the series impedance R2*c*), the application circuit 321 in the driver chip 320 can still receive a suitable input voltage VTc to operate normally according to the driving voltage VOc.

Figure 4A:
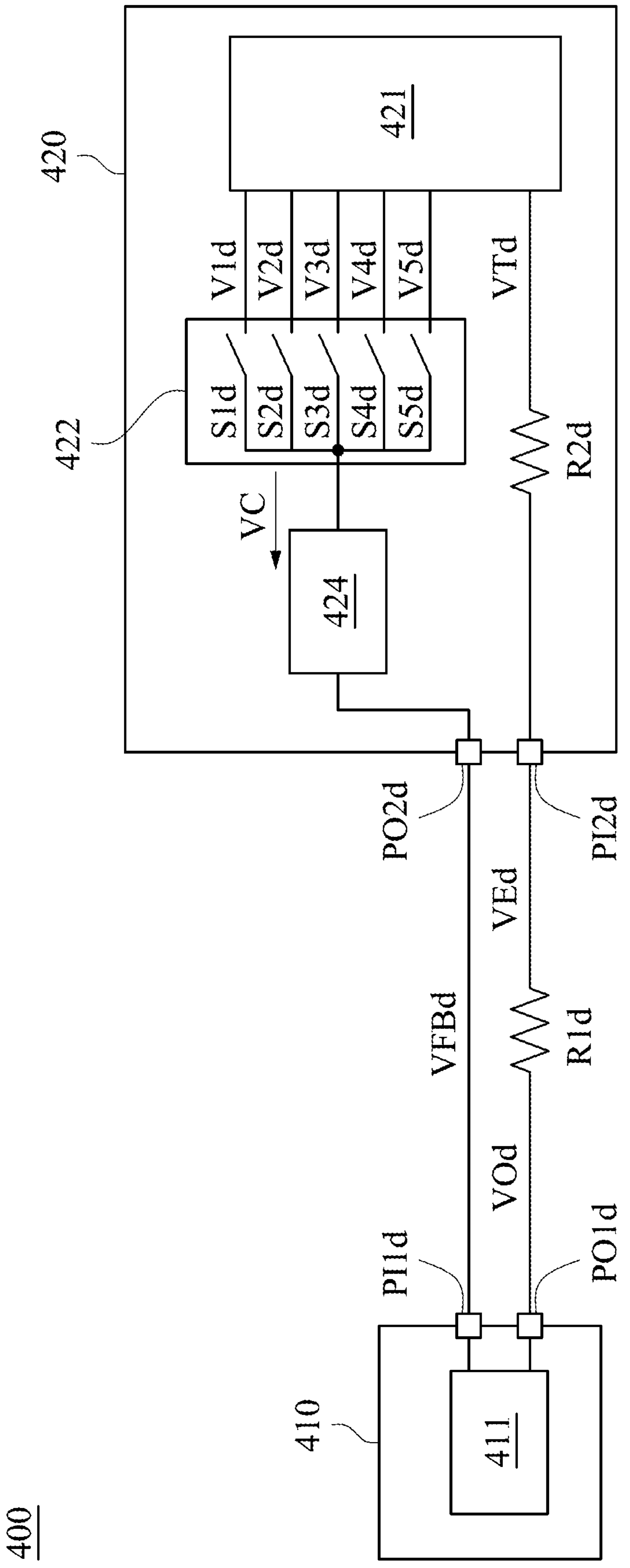
FIG. 4A is a schematic diagram of a feedback control system according to some embodiments of the present disclosure.

Reference is made to FIG. 4A. FIG. 4A is a schematic diagram of a feedback control system 400 according to some embodiments of the present disclosure.

A power chip 410, a voltage converter circuit 411, an output terminal PO1*d*, a driving voltage VOd, a series impedance R1*d*, an input voltage VEd, an input terminal PI2*d*, a series impedance R2*d*, an input voltage VTd, a driver chip 420, an application circuit 421, a control circuit 422, switches S1*d*-S5*d*, detection voltages V1*d*-V5*d*, an output terminal PO2*d*, a detection voltage VFBd, an input terminal PI1*d* in FIG. 4A are similar to the power chip 210, the voltage converter circuit 211, the output terminal PO1*b*, the driving voltage VOb, the series impedance R1*b*, the input voltage VEb, the input terminal PI2*b*, the series impedance R2*b*, the input voltage VTb, the driver chip 220, the application circuit 221, the control circuit 222, the switches S1*b*-S5*b*, the detection voltages V1*b*-V5*b*, the output terminal PO2*b*, the detection voltage VFBb, the input terminal PI1*b* in FIG. 2A respectively.

One of major differences between FIG. 4A and FIG. 2A is that the driver chip 420 in FIG. 4A further includes a resistor selecting circuit 424. The resistor selecting circuit 424 is coupled between the control circuit 422 and the output terminal PO2*d*. In some embodiments, the control circuit 422 switches the detection voltages V1*d*-V5*d* to generate a corresponding control voltage VC. The feedback resistor string in the resistor selecting circuit 424 can be adjusted to output the detection voltage VFBd, and the voltage converter circuit 411 can adjust the driving voltage VOd according to the detection voltage VFBd. Thus, it can immediately switch different feedback voltages and adjust different voltages according to different application conditions. Even if there is the IR drop problem (due to the series impedance R1*d* and the series impedance R2*d*), the application circuit 421 in the driver chip 420 can still receive a suitable input voltage VTd to operate normally according to the driving voltage VOd.

In the embodiment in FIG. 4A, the detection voltages V1*d*-V5*d* can be detected in the driver chip 420 and the resistor selecting circuit 424 is used to control the power chip 410 to adjust the driving voltage VOd. In this example, it can avoid time delay caused by other circuits, reduce the circuit area, and save power.

Figure 4B:
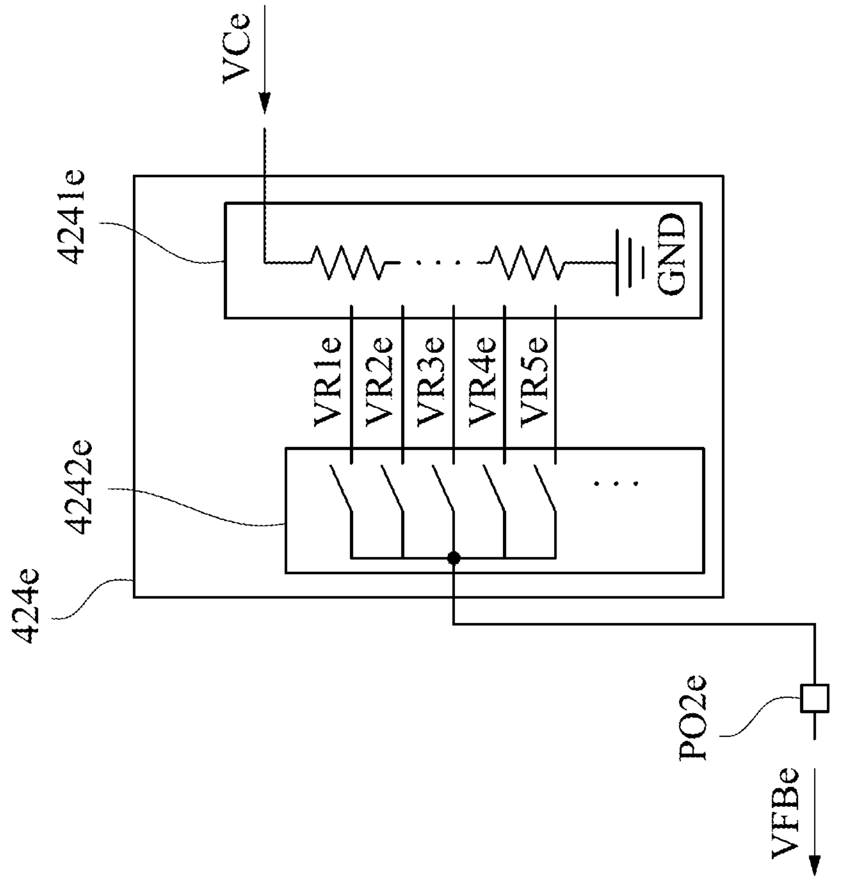
FIG. 4B is a schematic diagram of a resistor selecting circuit according to some embodiments of the present disclosure.

Reference is made to FIG. 4B. FIG. 4B is a schematic diagram of a resistor selecting circuit 424*e* according to some embodiments of the present disclosure. When the input voltage VTd in FIG. 4A is a positive voltage, the resistor selecting circuit 424 in FIG. 4A can be implemented by the resistor selecting circuit 424*e* in FIG. 4B.

As illustrated in FIG. 4B, the resistor selecting circuit 424*e* includes a feedback resistor string 4241*e* and a selector circuit 4242*e*.

The feedback resistor string 4241*e* is coupled to the control circuit 422 in FIG. 4A to receive a control voltage VCe which is generated by the control circuit 422 according to the detection voltages V1*d*-V5*d*. The feedback resistor string 4241*e* includes multiple resistors (e.g., 6 resistors, but it is not limited thereto) coupled in series, and these resistors are coupled between the control voltage VCe and a ground terminal GND. Different divided voltages VR1*e*-VR5*e* are generated at different nodes in the feedback resistor string 4241*e*. A voltage difference between the control voltage VCe and a ground voltage (the voltage at the ground terminal GND) and resistance values of these resistors coupled in series can be used to determine voltage values of the divided voltages VR1*e*-VR5*e*.

The selector circuit 4242*e* is coupled to the feedback resistor string 4241*e* to receive the divided voltages VR1*e*-VR5*e* and generates a detection voltage VFBe at an output terminal PO2*e* according to the divided voltages VR1*e*-VR5*e*. For example, the selector circuit 4242*e* can include multiple switches. First terminals of the switches receive the divided voltages VR1*e*-VR5*e* respectively, and second terminals of the switches are coupled to the output terminal PO2*e*. One of the switches is turned on to transmit a corresponding one of the divided voltages VR1*e*-VR5*e* to the output terminal PO2*e* to generate the detection voltage VFBe.

Figure 4C:
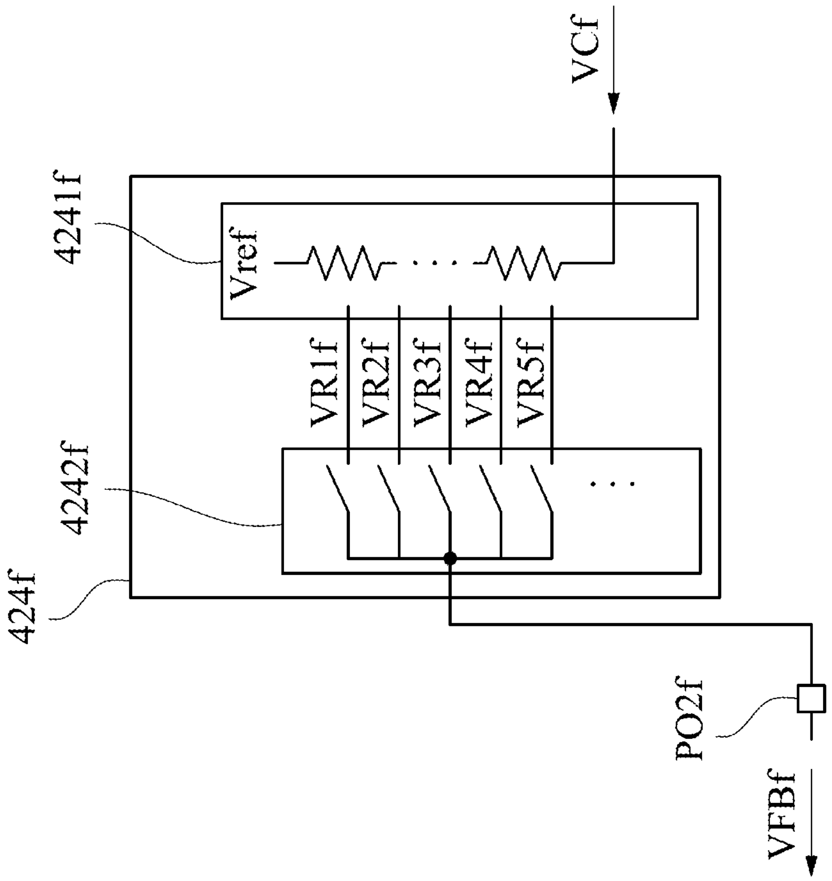
FIG. 4C is a schematic diagram of a resistor selecting circuit according to some embodiments of the present disclosure.

Reference is made to FIG. 4C. FIG. 4C is a schematic diagram of a resistor selecting circuit 424*f* according to some embodiments of the present disclosure. When the input voltage VTd in FIG. 4A is a negative voltage, the resistor selecting circuit 424 in FIG. 4A can be implemented by the resistor selecting circuit 424*f* in FIG. 4C.

As illustrated in FIG. 4C, the resistor selecting circuit 424*f* includes a feedback resistor string 4241*f* and a selector circuit 4242*f*.

The feedback resistor string 4241*f* is coupled to the control circuit 422 in FIG. 4A to receive a control voltage VCf which is generated by the control circuit 422 according to the detection voltages V1*d*-V5*d*. The feedback resistor string 4241*f* includes multiple resistors (e.g., 5 resistors, but it is not limited thereto) coupled in series, and these resistors are coupled between a reference voltage Vref and the control voltage VCf. Different divided voltages VR1*f*-VR5*f* are generated at different nodes in the feedback resistor string 4241*f*. A voltage difference between the reference voltage Vref and the control voltage VCf and resistance values of these resistors coupled in series can be used to determine voltage values of the divided voltages VR1_f_-VR5_f_.

The selector circuit 4242_f_ is coupled to the feedback resistor string 4241_f_ to receive the divided voltages VR1_f_-VR5_f_ and generates a detection voltage VFBf at an output terminal PO2_f_ according to the divided voltages VR1_f_-VR5_f_. Similarly, the selector circuit 4242_f_ can include multiple switches. First terminals of the switches receive the divided voltages VR1_f_-VR5_f_ respectively, and second terminals of the switches are coupled to the output terminal PO2_f_. One of the switches is turned on to transmit a corresponding one of the divided voltages VR1_f_-VR5_f_ to the output terminal PO2_f_ to generate the detection voltage VFBf.

Figure 4D:
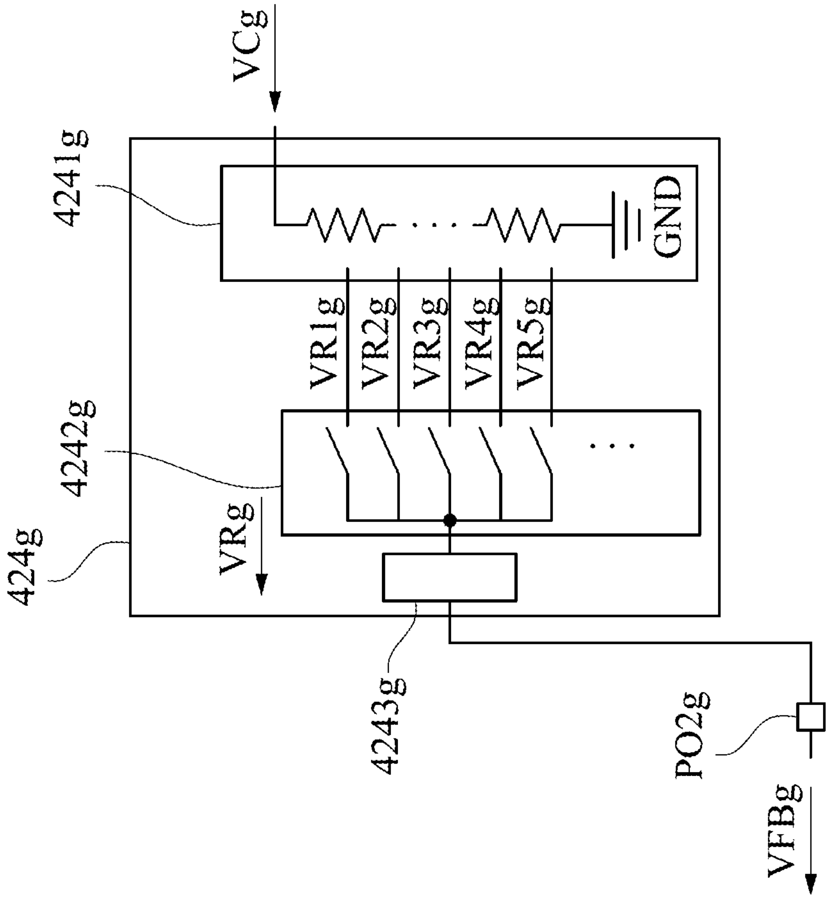
FIG. 4D is a schematic diagram of a resistor selecting circuit according to some embodiments of the present disclosure.

Reference is made to FIG. 4D. FIG. 4D is a schematic diagram of a resistor selecting circuit 424_g_ according to some embodiments of the present disclosure. When the input voltage VTd in FIG. 4A is a positive voltage, the resistor selecting circuit 424 in FIG. 4A can be implemented by the resistor selecting circuit 424_g_ in FIG. 4D.

A feedback resistor string 4241_g_, a selector circuit 4242_g_, a control voltage VCg, and divided voltages VR1_g_-VR5_g_ in FIG. 4D are similar to the feedback resistor string 4241_e_, the selector circuit 4242_e_, the control voltage VCe, and the divided voltages VR1_e_-VR5_e_ in FIG. 4B respectively.

One of major differences between FIG. 4D and FIG. 4B is that the resistor selecting circuit 424_g_ further includes a buffer 4243_g_. The buffer 4243_g_ is coupled between the selector circuit 4242_g_ and an output terminal PO2_g_ to receive a dividing signal VRg which is generated by the selector circuit 4242_g_ according to the divided voltages VR1_g_-VR5_g_. Then, the buffer 4243_g_ outputs a detection voltage VFBg at the output terminal PO2_g_ according to the dividing signal VRg. In some embodiments, the buffer 4243_g_ is implemented by a unit-gain buffer. In a condition that the input voltage VTd in FIG. 4A is a positive voltage, when there is a large parasitic capacitance on the path of the detection voltage VFBd in FIG. 4A or when there is a need for fast response, the buffer 4243_g_ can be disposed for the fast response.

Figure 4E:
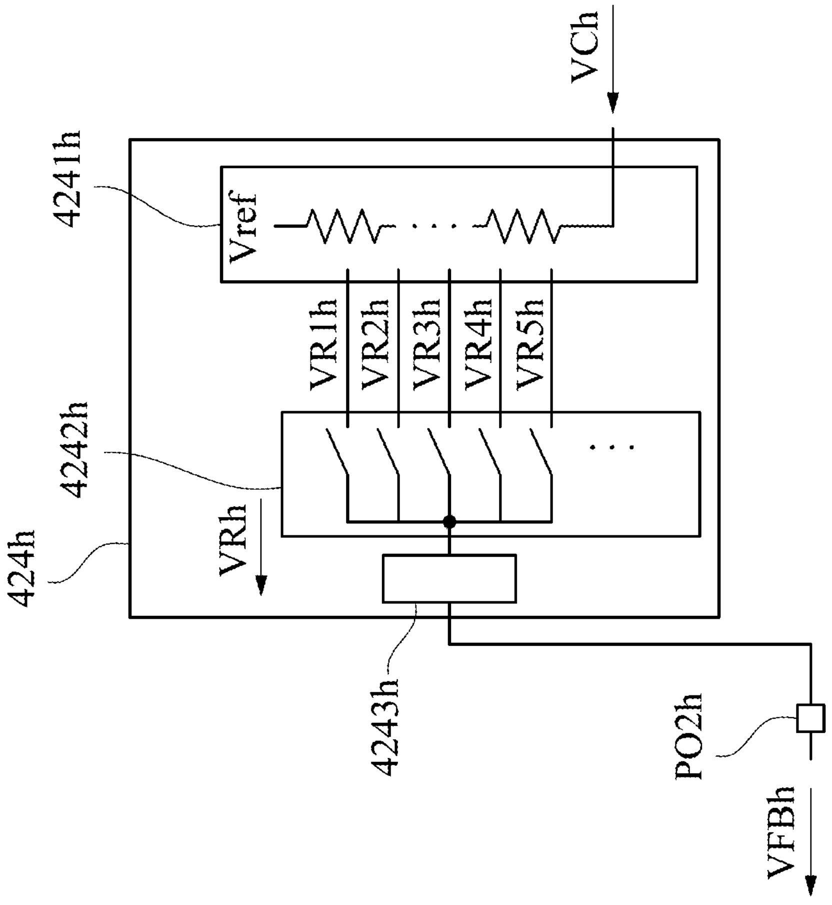
FIG. 4E is a schematic diagram of a resistor selecting circuit according to some embodiments of the present disclosure.

Reference is made to FIG. 4E. FIG. 4E is a schematic diagram of a resistor selecting circuit 424_h_ according to some embodiments of the present disclosure. When the input voltage VTd in FIG. 4A is a negative voltage, the resistor selecting circuit 424 in FIG. 4A can be implemented by the resistor selecting circuit 424_h_ in FIG. 4E.

A feedback resistor string 4241_h_, a selector circuit 4242_h_, a control voltage VCh, and divided voltages VR1_h_-VR5_h_ in FIG. 4E are similar to the feedback resistor string 4241_f_, the selector circuit 4242_f_, the control voltage VCf, and the divided voltages VR1_f_-VR5_f_ in FIG. 4C respectively.

One of major differences between FIG. 4E and FIG. 4C is that the resistor selecting circuit 424_h_ further includes a buffer 4243_h_. The buffer 4243_h_ is coupled between the selector circuit 4242_h_ and an output terminal PO2_h_ to receive a dividing signal VRh which is generated by the selector circuit 4242_h_ according to the divided voltages VR1_h_-VR5_h_. Then, the buffer 4243_h_ outputs a detection voltage VFBh at the output terminal PO2_h_ according to the dividing signal VRh. In some embodiments, the buffer 4243_h_ is implemented by a unit-gain buffer. In a condition that the input voltage VTd in FIG. 4A is a negative voltage, when there is a large parasitic capacitance on the path of the detection voltage VFBd in FIG. 4A or when there is a need for fast response, the buffer 4243_h_ can be disposed for the fast response.

Figure 5:
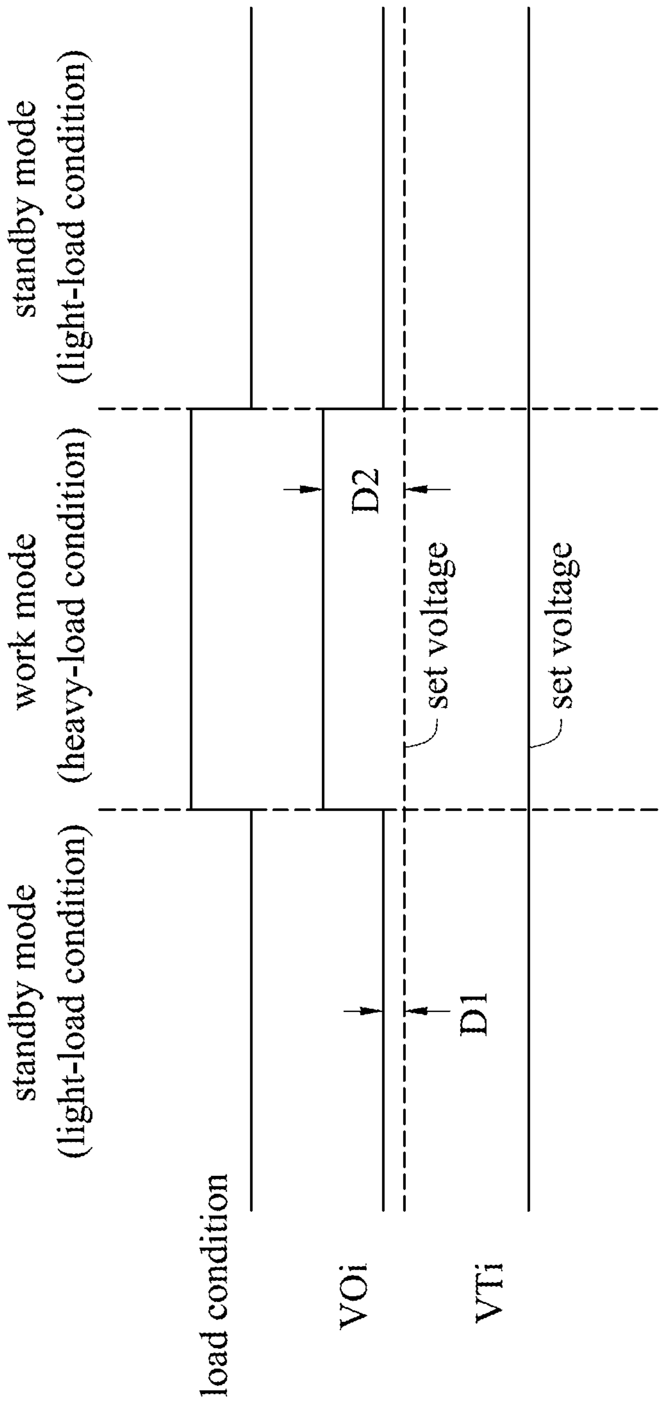
FIG. 5 is a timing diagram of load conditions, a driving voltage, and an input voltage according to some embodiments of the present disclosure.

Reference is made to FIG. 5. FIG. 5 is a timing diagram of load conditions, a driving voltage VOi, and an input voltage VTi according to some embodiments of the present disclosure. The driving voltage VOi and the input voltage VTi in FIG. 5 are similar to the driving voltage VOa and the input voltage VTa in FIG. 1 respectively.

As illustrated in FIG. 5, when the driver chip (as the driver chip 120 in FIG. 1) is in a standby mode, one or more application circuits are almost turned off and thus the load condition is the light-load condition. On the contrary, when the driver chip (as the driver chip 120 in FIG. 1) is in a work mode, the one or more application circuits are almost turned on and thus the load condition is the heavy-load condition.

In FIG. 5, the driving voltage VOi outputted by a power chip (as the power chip 110 in FIG. 1) can be adjusted to be higher than a set voltage and can be adjusted according to the load condition. For example, when the load condition is the light-load condition, there is a difference value D1 between the driving voltage VOi and the set voltage. When the load condition is the heavy-load condition, there is a difference value D2 between the driving voltage VOi and the set voltage. In FIG. 5, the set voltage is fixed.

In FIG. 5, by appropriately setting the difference value D1 to be less than the difference value D2 (e.g., setting the difference value D1 to be equal to the IR drop in the light-load condition and setting the difference value D2 to be equal to the IR drop in the heavy-load condition) (i.e., the driving voltage VOi in the light-load condition less than the driving voltage VOi in the heavy-load condition), the input voltage VTi inputted into the application circuit (e.g., the application circuit 121 in FIG. 1) is (almost) equal to the set voltage regardless of the load conditions. Accordingly, it can ensure the normal operation of the driver chip (the application circuit) even if it suffers from the IR drop.

Figure 6:
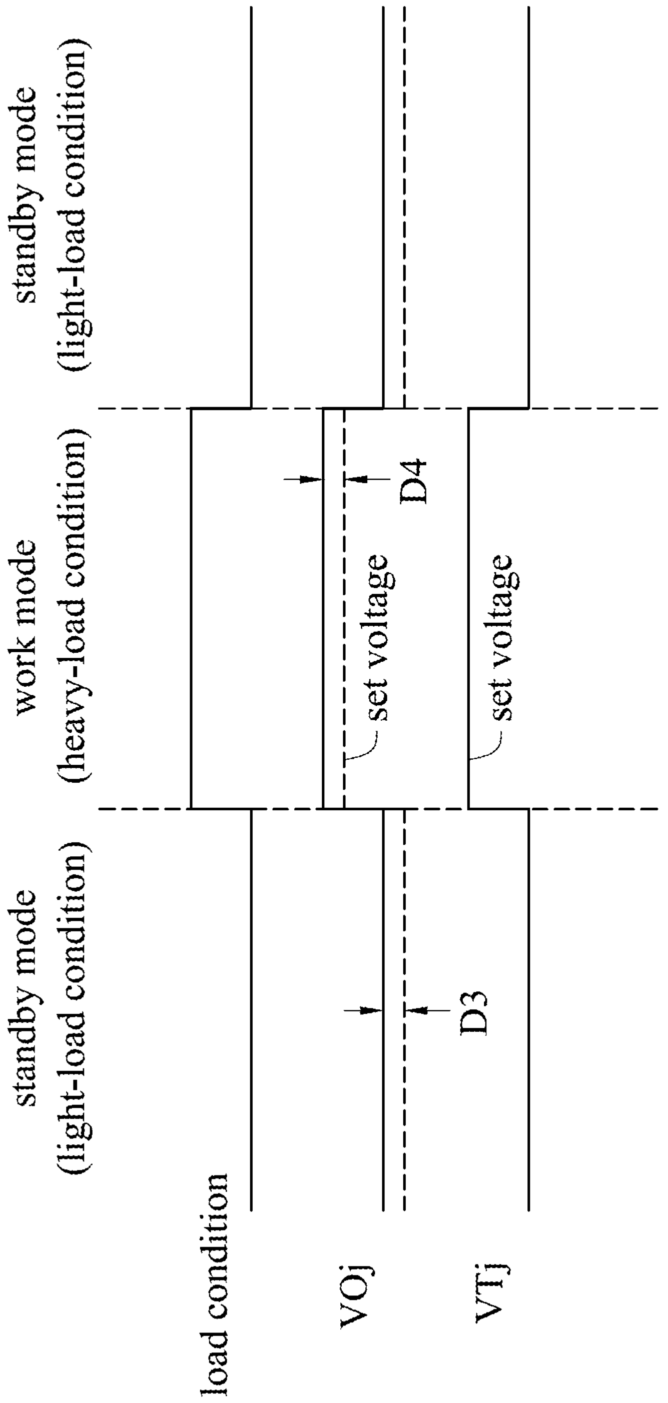
FIG. 6 is a timing diagram of load conditions, a driving voltage, and an input voltage according to some embodiments of the present disclosure.

Reference is made to FIG. 6. FIG. 6 is a timing diagram of load conditions, a driving voltage VOL and an input voltage VTj according to some embodiments of the present disclosure. The driving voltage VOj and the input voltage VTj in FIG. 6 are similar to the driving voltage VOa and the input voltage VTa in FIG. 1.

In FIG. 6, with the feedback resistor string in the resistor selecting circuit 424 in FIG. 4A, the driving voltage VOj outputted by a power chip can be adjusted to be higher than a set voltage and can be adjusted according to the load condition. For example, when the load condition is the light-load condition, there is a difference value D3 between the driving voltage VOi and the set voltage. When the load condition is the heavy-load condition, there is a difference value D4 between the driving voltage VOi and the set voltage. In FIG. 6, the set voltage is not fixed.

In FIG. 6, the difference value D3 can be set to be equal to the IR drop of the resistor selecting circuit 424 in the light-load condition, and the difference value D4 can be set to be equal to the IR drop of the resistor selecting circuit 424 in the heavy-load condition. Accordingly, even if it suffers the IR drop, the input voltage VTj inputted into the application circuit (e.g., the application circuit 121 in FIG. 1) is (almost) equal to the set voltage regardless of the load conditions. As illustrated in FIG. 6, the input voltage VTj and the driving voltage VOj are not fixed. When the load condition is the light-load condition, voltage values of the input voltage VTj and the driving voltage VOj can be less to save power (i.e., the input voltage VTj in the light-load condition is less than the input voltage VTj in the heavy-load condition, and the driving voltage VOj in the light-load condition is less than the driving voltage VOj in the heavy-load condition). On the contrary, when the load condition is the heavy-load condition, the voltage values of the input voltage VTj and the driving voltage VOj can be larger to ensure the normal operation of the driver chip (application circuit) even if it suffers the IR drop.

Figure 7:
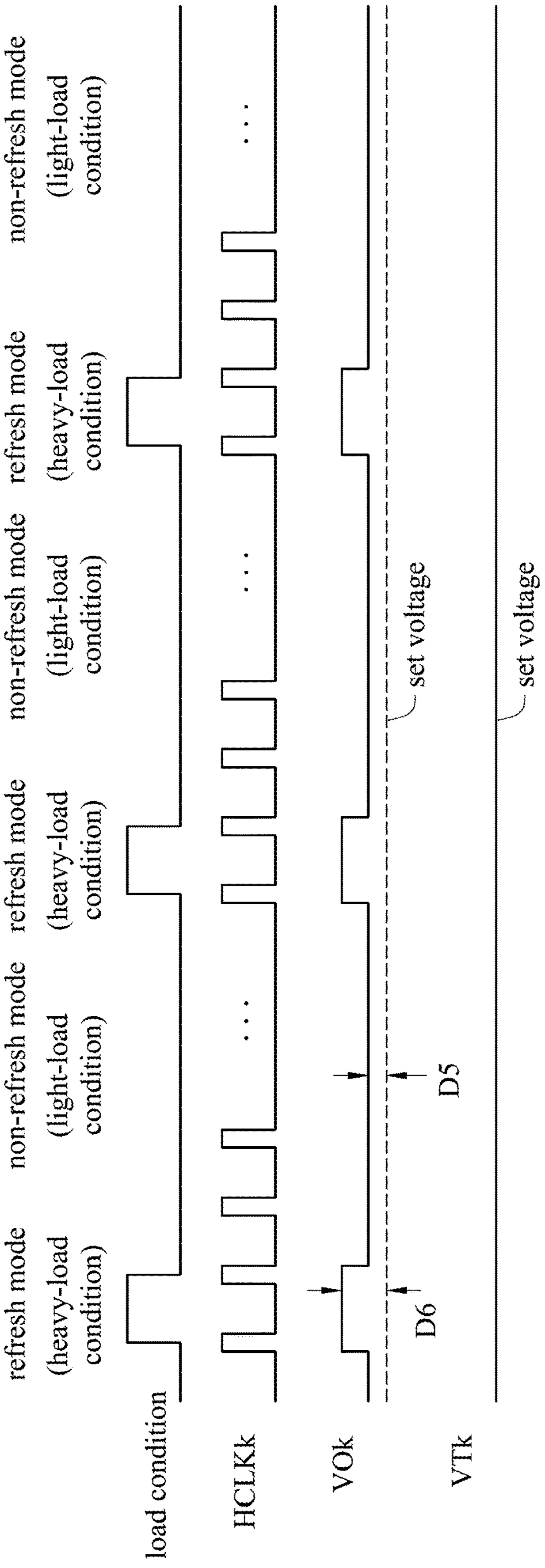
FIG. 7 is a timing diagram of load conditions, a clock signal, a driving voltage, and an input voltage according to some embodiments of the present disclosure.

Reference is made to FIG. 7. FIG. 7 is a timing diagram of load conditions, a clock signal HCLKk, a driving voltage VOk, and an input voltage VTk according to some embodiments of the present disclosure.

In some embodiments, the timing diagram in FIG. 7 can be applied to a display panel. For example, the timing diagram in FIG. 7 is applied to a Low Temperature Polycrystalline Oxide (LTPO) display panel, but the present disclosure is not limited thereto.

In applications, when a display panel is in a refresh mode, it represents that the display panel is processing display data. Accordingly, its load condition is the heavy-load condition. On the contrary, when a display panel is in a non-refresh mode, it represents that the display panel is not processing display data. Accordingly, its load condition is the light-load condition.

In FIG. 7, the driving voltage VOk outputted by a power chip can be adjusted to be higher than a set voltage and can be adjusted according to the load condition. For example, when the load condition is the light-load condition, there is a difference value D5 between the driving voltage VOk and the set voltage. When the load condition is the heavy-load condition, there is a difference value D6 between the driving voltage VOk and the set voltage. In FIG. 7, the set voltage is fixed.

In FIG. 7, by appropriately setting the difference value D5 to be less than the difference value D6 (e.g., setting the difference value D5 to be equal to the IR drop in the light-load condition and setting the difference value D6 to be equal to the IR drop in the heavy-load condition) (i.e., the driving voltage VOk in the light-load condition less than the driving voltage VOk in the heavy-load condition), the input voltage VTk inputted into the application circuit (e.g., the application circuit 121 in FIG. 1) is (almost) equal to the set voltage regardless of the load conditions. Accordingly, it can ensure the normal operation of the driver chip (the application circuit) even if it suffers from the IR drop.

Figure 8:
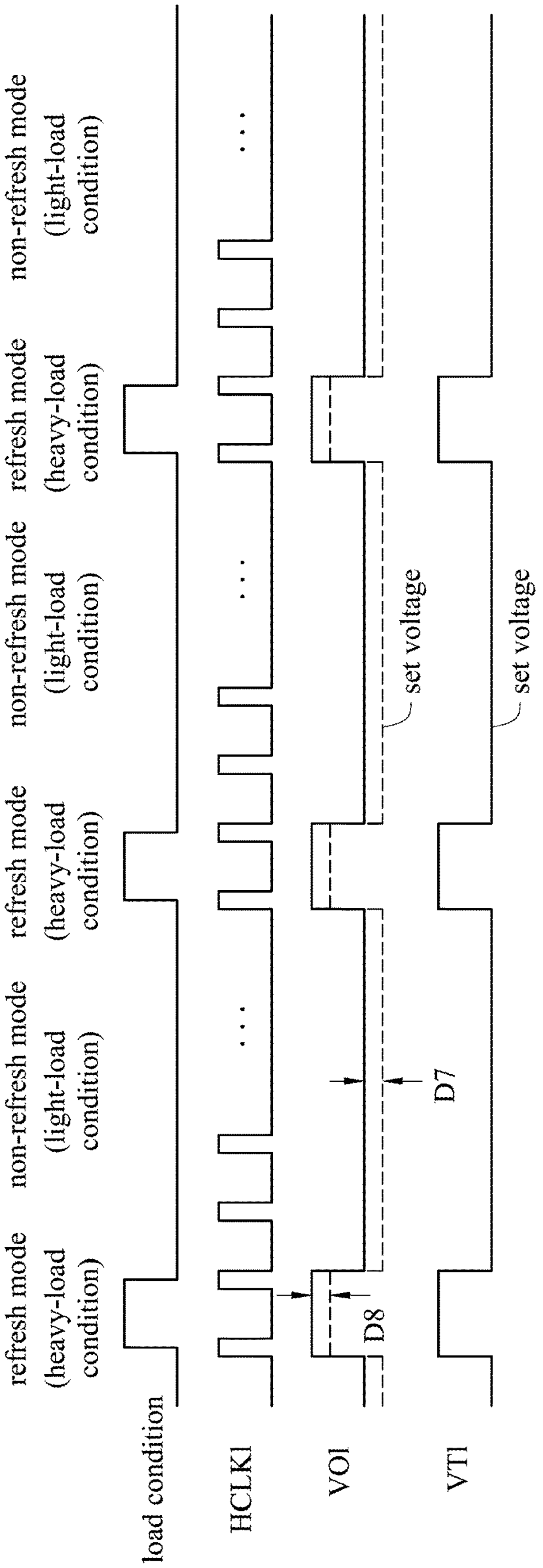
FIG. 8 is a timing diagram of load conditions, a clock signal, a driving voltage, and an input voltage according to some embodiments of the present disclosure.

Reference is made to FIG. 8. FIG. 8 is a timing diagram of load conditions, a clock signal HCLKI, a driving voltage VOI, and an input voltage VTI according to some embodiments of the present disclosure.

In FIG. 8, with the feedback resistor string in the resistor selecting circuit 424 in FIG. 4A, the driving voltage Vol outputted from a power chip can be adjusted to be higher than the set voltage and the driving voltage Vol can be adjusted according to the load condition. For example, when the load condition is the light-load condition, there is a difference value D7 between the driving voltage VOI and the set voltage. When the load condition is the heavy-load condition, there is a difference value D8 between the driving voltage VOI and the set voltage. In FIG. 8, the set voltage is not fixed.

In FIG. 8, the difference value D7 can be set to be equal to the IR drop of the resistor selecting circuit 424 in the light-load condition, and the difference value D8 can be set to be equal to the IR drop of the resistor selecting circuit 424 in the heavy-load condition. Accordingly, even if it suffers the IR drop, the input voltage VTI inputted into the application circuit (e.g., the application circuit 121 in FIG. 1) is (almost) equal to the set voltage regardless of the load conditions. As illustrated in FIG. 8, the input voltage VTI and the driving voltage VOI are not fixed. When the load condition is the light-load condition, voltage values of the input voltage VTI and the driving voltage VOI can be less to save power. On the contrary, when the load condition is the heavy-load condition, the voltage values of the input voltage VTI and the driving voltage VOI can be larger to ensure the normal operation of the driver chip (application circuit) even if it suffers the IR drop.

Figure 9:
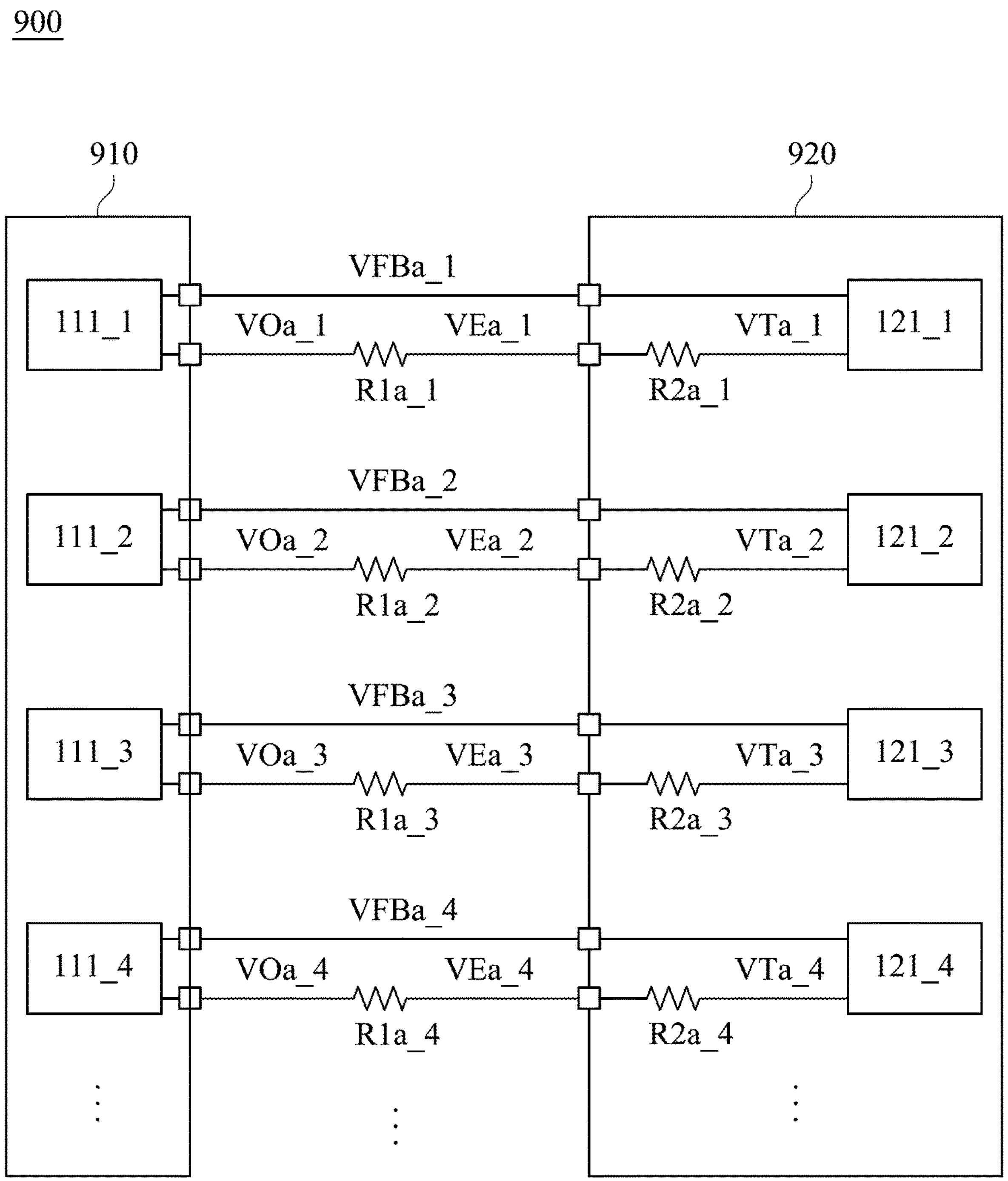
FIG. 9 is a schematic diagram of a feedback control system according to some embodiments of the present disclosure.

Reference is made to FIG. 9. FIG. 9 is a schematic diagram of a feedback control system 900 according to some embodiments of the present disclosure.

The feedback control system 900 in FIG. 9 is equivalent to multiple feedback control systems 100 in FIG. 1. As illustrated in FIG. 9, a power chip 910 in the feedback control system 900 includes multiple voltage converter circuits 111_1-111_4, and a driver chip 920 in the feedback control system 900 includes multiple application circuits 121_1-121_4.

The voltage converter circuit 111_1 (111_2, 111_3, or 111_4), an application circuit 121_1 (121_2, 121_3, or 121_4), a detection voltage VFBa_1 (VFBa_2, VFBa_3, or VFBa_4), a driving voltage VOa_1 (VOa_2, VOa_3, or VOa_4), an input voltage VEa_1 (VEa_2, VEa_3, or VEa_4), an input voltage VTa_1 (VTa_2, VTa_3, or VTa_4), a series impedance R1*a*_1 (R1*a*_2, R1*a*_3, or R1*a*_4), a series impedance R2*a*_1 (R2*a*_2, R2*a*_3, or R2*a*_4) in FIG. 9 are similar to the voltage converter circuit 111, the application circuit 121, the detection voltage VFBa, the driving voltage VOa, the input voltage VEa, the input voltage VTa, the series impedance R1*a*, and the series impedance R2*a* in FIG. 1 respectively.

In the configuration of FIG. 9, the voltage converter circuits 111_1-111_4 can adjust the driving voltages VOa_1-VOa_4 according to the detection voltages VFBa_1-VFBa_4 respectively to ensure that the application circuits 121_1-121_4 in the driver chip 920 can operate normally.

Although there are four groups in FIG. 9, the present disclosure is not limited thereto.

Figure 10:
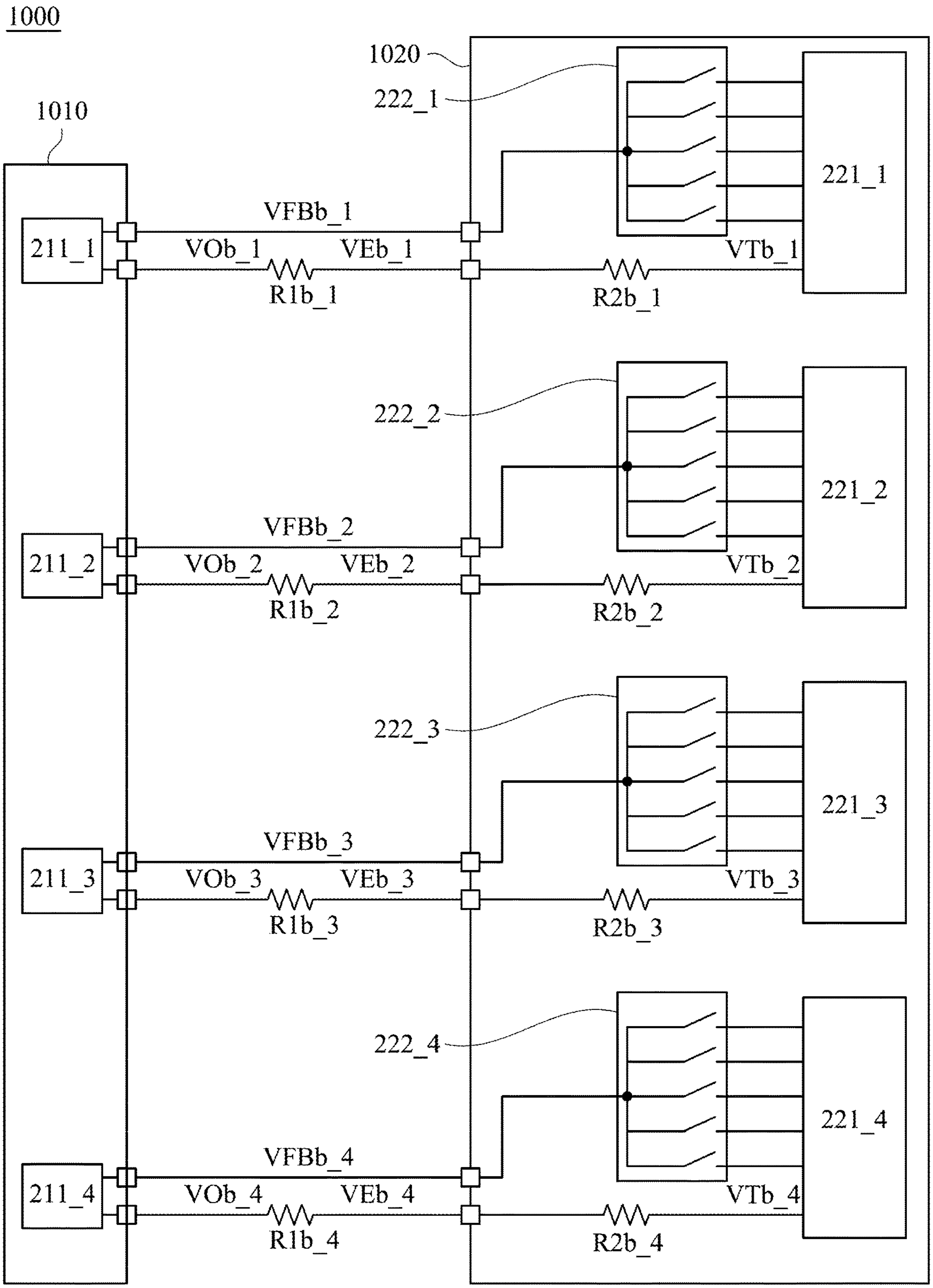
FIG. 10 is a schematic diagram of a feedback control system according to some embodiments of the present disclosure.

Reference is made to FIG. 10. FIG. 10 is a schematic diagram of a feedback control system 1000 according to some embodiments of the present disclosure.

The feedback control system 1000 in FIG. 10 is equivalent to multiple feedback control systems 200 in FIG. 2. As illustrated in FIG. 10, a power chip 1010 in the feedback control system 1000 includes multiple voltage converter circuits 211_1-211_4, and a driver chip 1020 in the feedback control system 1000 includes multiple application circuits 221_1-221_4.

The voltage converter circuit 211_1 (211_2, 211_3, or 211_4), the application circuit 221_1 (221_2, 221_3, or 221_4), a control circuit 222_1 (222_2, 222_3, or 222_4), a detection voltage VFBb_1 (VFBb_2, VFBb_3, or VFBb_4), a driving voltage VOb_1 (VOb_2, VOb_3, or VOb_4), an input voltage VEb_1 (VEb_2, VEb_3, or VEb_4), an input voltage VTb_1 (VTb_2, VTb_3, or VTb_4), a series impedance R1*b*_1 (R1*b*_2, R1*b*_3, or R1*b*_4), a series impedance R2*b*_1 (R2*b*_2, R2*b*_3, or R2*b*_4) in FIG. 10 are similar to the voltage converter circuit 211, the application circuit 221, the control circuit 222, the detection voltage VFBb, the driving voltage VOb, the input voltage VEb, the input voltage VTb, the series impedance R1*b*, the series impedance R2*b* in FIG. 2 respectively.

In the configuration of FIG. 10, the control circuits 222_1-222_4 can switch according to application conditions of the application circuit 221_1-221_4 to generate the detection voltage VFBb_1-VFBb_4 respectively. Effectively, each of the voltage converter circuits 211_1-211_4 can adjust the driving voltages VOb_1-VOb_4 according to different detection voltages corresponding to different current consumption. Thus, even if there is the IR drop problem, the application circuits 221_1-221_4 in the driver chip 1020 can still receive a suitable input voltages VTb_1-VTb_4 to operate normally and the effect of reducing power can be achieved.

Although there are four groups in FIG. 10, the present disclosure is not limited thereto.

Figure 11:
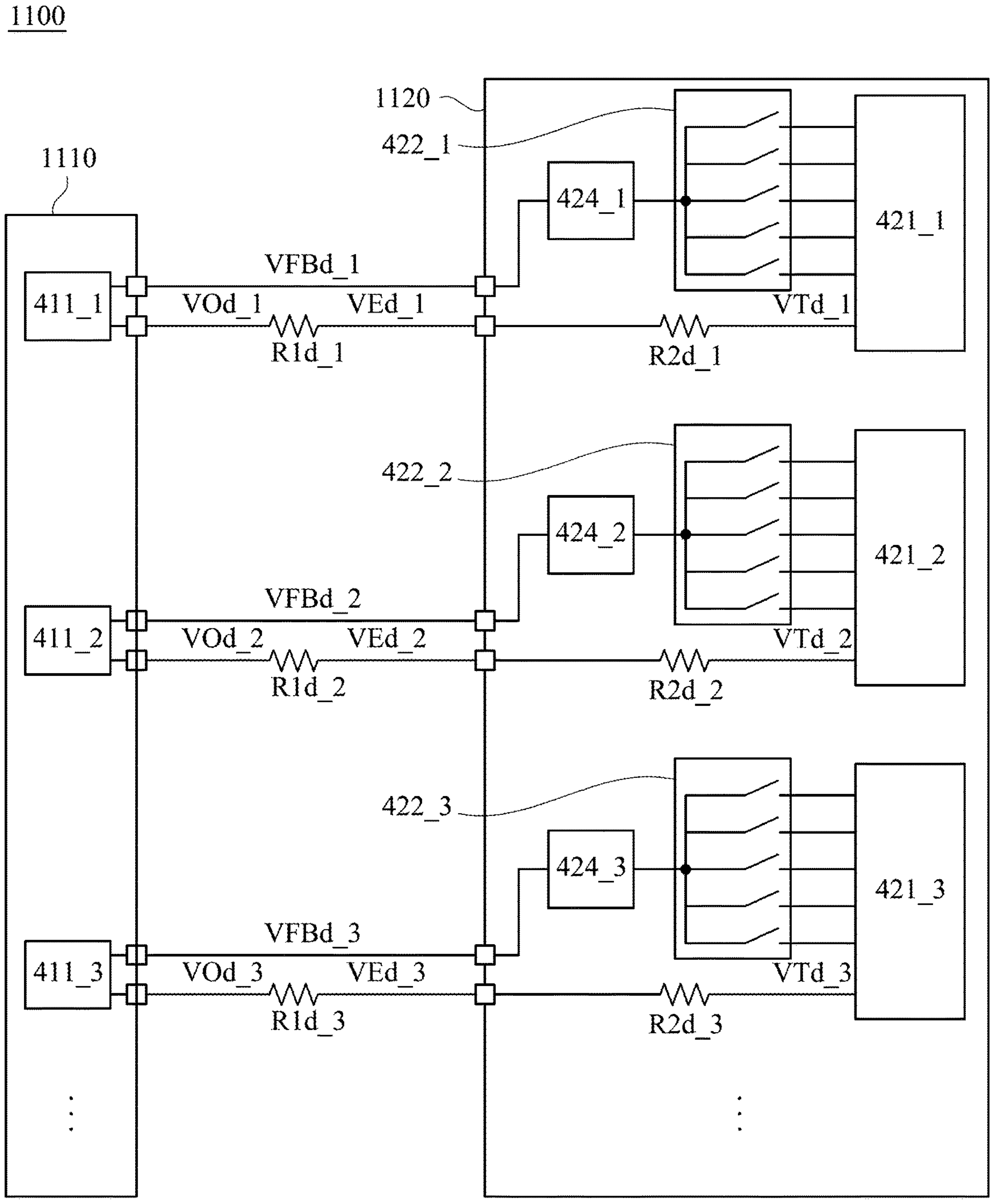
FIG. 11 is a schematic diagram of a feedback control system according to some embodiments of the present disclosure.

Reference is made to FIG. 11. FIG. 11 is a schematic diagram of a feedback control system 1100 according to some embodiments of the present disclosure.

The feedback control system 1100 in FIG. 11 is equivalent to multiple feedback control systems 400 in FIG. 4A. As illustrated in FIG. 11, a power chip 1110 in the feedback control system 1100 includes multiple voltage converter circuits 411_1-411_3, and a driver chip 1120 in the feedback control system 1100 includes multiple application circuits 421_1-421_3.

The voltage converter circuit 411_1 (411_2 or 411_3), the application circuit 421_1 (421_2 or 421_3), a control circuits 422_1 (422_2 or 422_3), a resistor selecting circuits 424_1 (424_2 or 424_3), a detection voltage VFBd_1 (VFBd_2 or VFBd_3), a driving voltage VOd_1 (VOd_2 or VOd_3), an input voltage VEd_1 (VEd_2 or VEd_3), an input voltage VTd_1 (VTd_2 or VTd_3), a series impedance R1*d*_1 (R1*d*_2 or R1*d*_3), a series impedance R2*d*_1 (R2*d*_2 or R2*d*_3) in FIG. 11 are similar to the voltage converter circuit 411, the application circuit 421, the control circuit 422, the resistor selecting circuit 424, the detection voltage VFBd, the driving voltage VOd, the input voltage VEd, the input voltage VTd, the series impedance R1*d*, the series impedance R2*d* in FIG. 4A respectively.

Although there are four groups in FIG. 11, the present disclosure is not limited thereto.

In the configuration of FIG. 11, it can directly detect multiple detection voltages in the driver chip 1120 and the resistor selecting circuits 424_1-424_3 can be used to control the power chip 1110 to adjust the driving voltages VOd_1-VOd_3. Accordingly, it does not need to utilize an additional circuit to adjust the driving voltages. In this example, there is no time delay caused by the additional circuit and the circuit area and the power can be reduced.

As described above, in the present disclosure, the power chip can adjust the driving voltage according to the detection voltage from the driver chip. Accordingly, even if the driving voltage suffers from IR drop problems, the driver chip can still receive the suitable input voltage to operate normally.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A feedback control system, comprising:

a driver chip comprising a first output terminal and a first input terminal, wherein the first output terminal is to output a first detection voltage; and a power chip comprising a second input terminal and a second output terminal, wherein the second input terminal is directly connected to the first output terminal, and the second output terminal is coupled to the first input terminal, wherein the power chip generates a driving voltage according to the first detection voltage and outputs the driving voltage to the first input terminal, wherein the driver chip comprises:

at least one application circuit;

at least one control circuit coupled between the at least one application circuit and the first output terminal to generate the first detection voltage according to a second detection voltage or a third detection voltage from the at least one application circuit; and at least one resistor selecting circuit coupled between the at least one control circuit and the first output terminal to output the first detection voltage according to the second detection voltage or the third detection voltage, wherein the at least one application circuit comprises a first functional circuit and a second functional circuit, the second detection voltage is a first input voltage of the first functional circuit, and the third detection voltage is a second input voltage of the second functional circuit.

2. The feedback control system of claim 1, wherein the at least one control circuit comprises:

a plurality of switches coupled between the at least one application circuit and the first output terminal to receive the second detection voltage and the third detection voltage respectively.

3. The feedback control system of claim 1, wherein the power chip further comprises:

a voltage converter circuit coupled to the at least one resistor selecting circuit to adjust the driving voltage according to the first detection voltage.

4. The feedback control system of claim 1, wherein the at least one resistor selecting circuit comprises:

a feedback resistor string coupled to the at least one control circuit to receive a control voltage which is generated by the at least one control circuit according to the second detection voltage or the third detection voltage and to generate a plurality of divided voltages according to the control voltage; and a selector circuit coupled to the feedback resistor string to receive the plurality of divided voltages and to generate the first detection voltage at the first output terminal according to the plurality of divided voltages.

5. The feedback control system of claim 4, wherein the feedback resistor string is coupled between the control voltage and a ground terminal.

6. The feedback control system of claim 4, wherein the feedback resistor string is coupled between a reference voltage and the control voltage.

7. The feedback control system of claim 4, wherein the at least one resistor selecting circuit further comprises:

a buffer coupled between the selector circuit and the first output terminal.

8. The feedback control system of claim 1, wherein when the driver chip is in a light-load condition, the driving voltage has a first value, wherein when the driver chip is in a heavy-load condition, the driving voltage has a second value, wherein the first value is less than the second value.

9. The feedback control system of claim 1, wherein the at least one application circuit comprises:

a plurality of application circuits, wherein each of the plurality of application circuits is to output the first detection voltage to the power chip.

10. The feedback control system of claim 9, wherein the at least one control circuit comprises:

a plurality of control circuits, wherein each of the plurality of control circuits is to receive the second detection voltage or the third detection voltage from a corresponding one of the plurality of application circuits to output the first detection voltage.

11. The feedback control system of claim 10, wherein the at least one resistor selecting circuit comprises:

a plurality of resistor selecting circuits, wherein each of the plurality of resistor selecting circuits is coupled between a corresponding one of the plurality of control circuits and a corresponding one of a plurality of the first input terminals.

12. A feedback control method, comprising:

outputting, by a first output terminal of a driver chip, a first detection voltage, wherein the driver chip further comprises a first input terminal;

receiving, by a second input terminal of a power chip, the first detection voltage, wherein the second input terminal of the power chip is directly connected to the first output terminal of the driver chip, and a second output terminal of the power chip is coupled to the first input terminal of the driver chip;

generating, by the power chip, a driving voltage according to the first detection voltage; and outputting, by the power chip, the driving voltage to the first input terminal of the driver chip, wherein the driver chip comprises:

an application circuit;

a control circuit coupled between the application circuit and the first output terminal to generate the first detection voltage according to a second detection voltage or a third detection voltage from the application circuit; and a resistor selecting circuit coupled between the control circuit and the first output terminal to output the first detection voltage according to the second detection voltage or the third detection voltage, wherein the application circuit comprises a first functional circuit and a second functional circuit, the second detection voltage is a first input voltage of the first functional circuit, and the third detection voltage is a second input voltage of the second functional circuit.

13. The feedback control method of claim 12, wherein the feedback control method further comprises:

receiving, by a plurality of switches in the control circuit, the second detection voltage and the third detection voltage respectively.

* * * * *